Sept. 26, 1961 M. W. MUELLER 3,001,535
TEST REGULATOR
Filed April 30, 1958
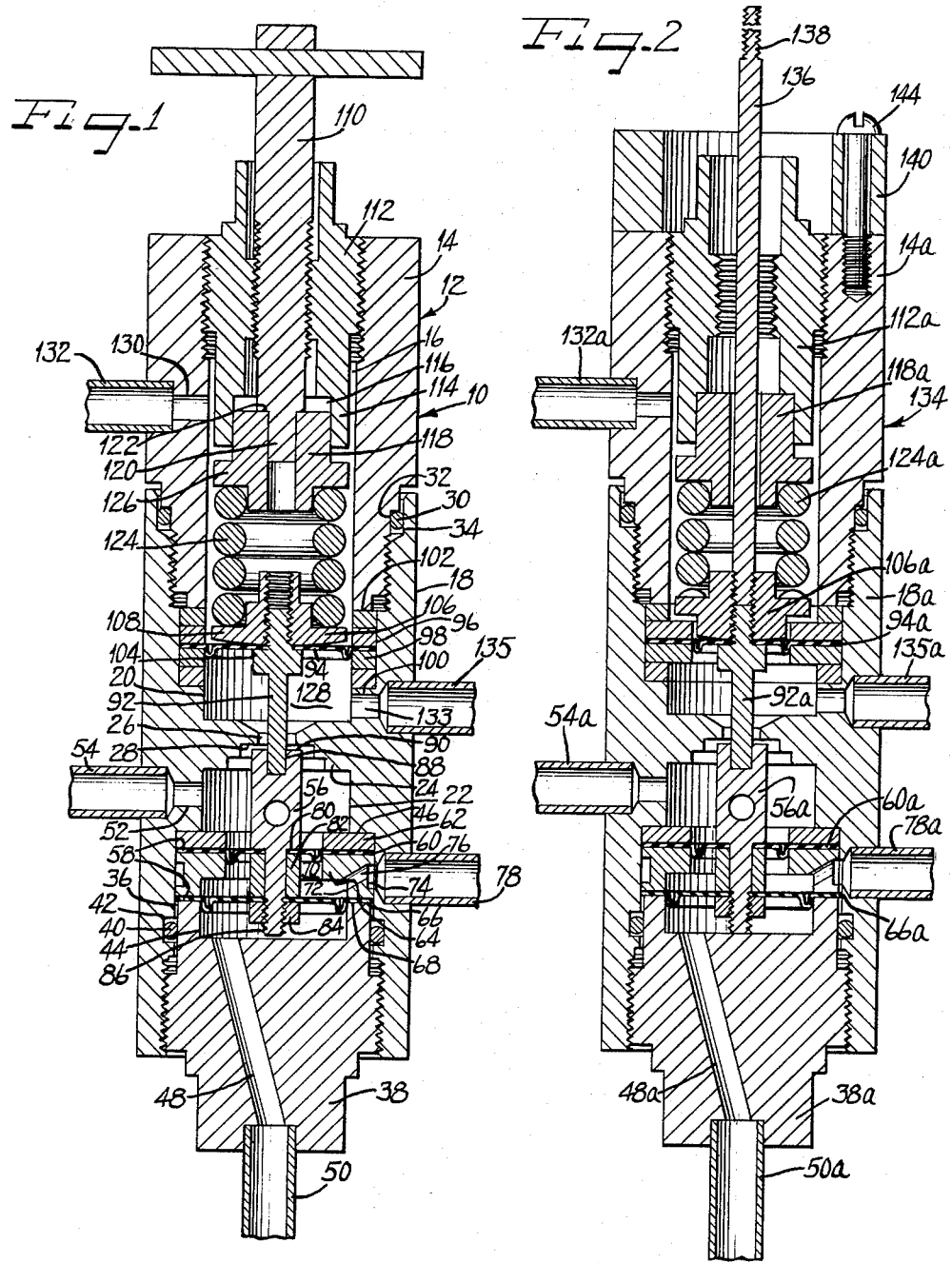
Inventor
Milton W. Mueller
by Hill, Sherman, Meroni, Gross Simpson Attys

United States Patent Office 3,001,535
Patented Sept. 26, 1961

3,001,535
TEST REGULATOR
Milton W. Mueller, Cleveland, Ohio, assignor to Thompson Ramo Wooldridge Inc., a corporation of Ohio
Filed Apr. 30, 1958, Ser. No. 732,028
3 Claims. (Cl. 137—51)

This invention relates to a test regulator for stabilizing the mercury cycle of turbine engines, and more particularly, to a regulator which may be reset in accordance with manual or speed sensitive means acting on a diaphragm which cooperates with a double-layered diaphragm responsive to fluid at an initial pressure and fluid at a regulating pressure to afford an accurate fluid pressure control.

The invention provides a casing having valve means responsive to the positon of a diaphragm whose setting is determined by speed sensitive means or manual control means, and to the position of a double-layered diaphragm. A pressure-regulating fluid is introduced into contact with the resetting diaphragm and also, at the same or at a different pressure, into contact with the double-layered diaphragm. The fluid whose pressure is to be controlled is introduced into contact with the double-layered diaphragm at two sides thereof, and in one embodiment of the invention, this fluid acts on the upper surface of an upper diaphragm of the double-layered diaphragm, and passes through the valve means into contact with the lower surface of the resetting diaphragm and is released through an outlet between the valve means and the resetting diaphragm. In this embodiment, the fluid whose pressure is to be controlled is also introduced into contact with the lower surface of the lower diaphragm of the double-layered diaphragm while the regulating fluid is introduced between the diaphragms of the double-layered diaphragm to assist in determining the position of a valve mounted on the double-layered diaphragm and responsive to a valve control pin carried by the resetting diaphragm.

Accordingly, it is an object of the present invention to provide a test regulator for stabilizing the mercury cycle of turbines which is adapted to be reset in accordance with a speed sensitive signal or manually, by means of a diaphragm structure wherein a double-layered diaphragm is responsive to a pressure to be controlled and a controlling pressure, and a second diaphragm is responsive to means for transmitting the resetting signal and to a controlling pressure, both diaphragms being effective to control a valve for producing a desired pressure change in the pressure to be controlled.

Another object of the invention is to provide a test regulator as described which is adapted to provide a negative control, but whose control characteristics may be varied in accordance with diaphragm sizes therein or the configuration of the flow orifices thereof.

Another object of the invention is to provide a test regulator which may be calibrated in accordance with a pressure regulating fluid, the pressure of which may be continuously varied by suitable means such as electric signal means.

Yet another object of the invention is to provide a test regulator of simple, compact construction, which is responsive to changes in the pressure of the fluid whose pressure is to be controlled as well as to speed changes in a turbine and whose controls interact to afford a uniform pressure as desired.

Other objects and advantages of the invention will become apparent as the description proceeds in accordance with the drawings, in which:

FIGURE 1 is a vertical sectional view of a test regulator according to the invention which may be manually reset; and FIGURE 2 is a showing of a mercury regulator assembly according to the invention which is similar to the regulator of FIGURE 1 but adapted to be controlled by compound-motor means.

Referring now to FIGURE 1, a mercury regulator 10 is shown which is of a type adapted to be reset either manually or in accordance with motor means responsive to a speed signal, as hereinafter described, the device illustrated being of the compound manual type. The regulator 10 comprises a casing 12 which includes an upper cylindrical section 14 defining a bore 16 and a lower section 18 defining an upper bore 20 and a lower bore 22 separated by an annular shoulder 24 defining a valve opening 26 and valve shoulder 28. The upper section 14 is threadedly engaged in the lower section 18 in sealed relation thereto by means of an O-ring 30 between annular, radially spaced walls 32 and 34, and the lower section 18 has a relatively enlarged portion 36 of the bore 22 in which a cylindrical plug 38 is threadedly engaged in sealed relationship, by means of an O-ring 40 received in an annular recess 42 in the section 18. The plug 38 defines a bore 44 therein at its upper end which is preferably of the same diameter as the portion of the bore 22 above the shoulder 46 at the upper end of the bore portion 36, as well as of the same diameter as the coaxial bores 16 and 20, and a passage 48 is also provided in the plug 38 which is continuous with a conduit 50 leading from a source of fluid whose pressure is to be controlled, as hereinafter further described.

The section 18 has formed therein an orifice 52 connected to a conduit 54 which also leads from the source of fluid to be controlled, the orifice 52 being adapted to introduce fluid into the portion of the bore 22 above the shoulder 46. In order to afford a desired metering of fluid entering through orifice 52, a valve 56 is provided which is mounted on a double layered diaphragm 58 according to the invention, the diaphragm 58 including an upper diaphragm 60 held in fixed relation to the shoulder 46 by a retainer ring 62 and metering ring 64, and a lower diaphragm 66 secured in predetermined axially spaced relation below the diaphragm 60 by the metering ring 64 and the upper, annular end 68 of the plug 38, which may be moved axially upwardly to a desired extent for this purpose. The metering ring has an upper bore 70 whose diameter corresponds to that of the bore in the retainer ring 62, and a lower bore 72 whose diameter corresponds to that of the bore 44 in the plug 38. In order to provide a regulating action for the diaphragm 58, the metering ring 64 also defines an annular passage 74 and an orifice 76 in register with a conduit 78 leading from a source of pressure regulating fluid. The valve 56 is mounted on the diaphragm 58 by means of a shoulder 80 resting on the diaphragm 60, a spacer nut 82 disposed between diaphragms 60 and 66 and a nut 84 secured beneath the diaphragm 66 on a shank portion 86 of the valve 56. The upper end of the valve 56 has formed therein a recess 88 and the annular end 90 of the valve is adapted to approach the valve shoulder 28 in accordance with the movement of the diaphragm 56. The shank 86 may also afford a stop to limit the extent to which fluid may pass through the valve opening 26.

A linkage pin 92 is received in the recess 88 of the valve 56 and is mounted dependingly upon a diaphragm 94 which is secured in an enlarged portion 96 of the bore 20 by means of a plurality of rings 98 retained between a shoulder 100 in the section 18 and the end 102 of the section 14, the section 14 being suitably tightened to engage the diaphragm 94 firmly. The linkage pin 92 has a shoulder 104 therein which is held securely against the diaphragm 94 by means of a nut 106 on the other side of the diaphragm having an annular flange 108.

Adjustment of the position of the diaphragm 94, and resetting of the valve 56, is accomplished, in accordance with the embodiment of FIGURE 1, by means of a shaft 110 which is adjustably received in an internally and externally threaded sleeve 112 at the upper end of the bore 16. The sleeve 112 has a depending annular flange 114 which has an enlarged bore 16 for slidably receiving a retaining element 118 which is mounted on an extension 120 of the shaft 110 and bears against a shoulder 122 thereof. A helical spring 124 bears against the flange 108 of the nut 106 and the flange 126 of the element 118 so that axial movement of the shaft 110 is effective to vary the setting of the diaphragm 94 as well as the double layered diaphragm 58, by means of the linkage pin 92. The linkage pin has a predetermined diameter such as to afford a desired cross sectional flow area at the valve opening 26, and it will be understood that the pressure in the chamber 128 between the valve opening 26 and the diaphragm 94 will be determined by the position of the diaphragm 94 and the fluid from the conduit 54, and that this pressure will in turn act upon the valve end 90 to cooperate with the valve structure 58 in determining the flow through the opening 26.

Control of the diaphragm 94, and of the valve 56, is determined also by presure introduced through an orifice 130 in the casing 14 which is connected with a conduit 132 which leads to a source of regulating pressure fluid which may be at the same pressure as the fluid from conduit 78, or different therefrom as desired, and suitable control means, preferably of an electric signal type (not shown) may be used to vary the regulating pressures.

The fluid at a pressure to be controlled, from conduit 50 and conduit 54, acts on the opposite sides of the diaphragm structure 58 and on the diaphragms 60 and 66 thereof respectively, while fluid at a regulating pressure from the conduit 78 acts on the interior of the diaphragm structure 58, and on the diaphragms 60 and 68, to afford a desired degree of resilience therein, this pressure being determined by electrical signal means or otherwise. It will be seen, however, that the diaphragm 66 is exposed to the pressure to be controlled over a larger surface area than the diaphragm 60, the outer areas of the diaphragm 60 being held against flexing by the retainer ring 62, so that the diaphragm means 58 biases the valve 56 upwardly, as controlled by the interior pressure from conduit 78. The regulating pressure on diaphragm 94 from the conduit 132, however, biases the diaphragm 94 and valve 56 in the other direction, so that extremely precise control is afforded. The resetting action of the shaft 110, as described, operates to vary the control as desired, the spring 124 cooperating with the regulating pressure from conduit 132, as well as pressure from the conduit 78. The fluid is thereupon passed from the regulator through an orifice 133 to an outlet conduit 135.

Referring now to FIGURE 2, a second embodiment of the invention is shown, in which similar numbers refer to similar parts, but which provides for speed sensitive control means. Thus a mercury regulator assembly 134 is provided which is of a compound-motor type, a control shaft 136 extending through the sleeve 112a and the element 118a into threaded engagement with the nut 106a. Axial movement of the shaft 136 is afforded by torque responsive means (not shown) threadedly engaged at the upper end 138 of the shaft 136, and a sleeve 140 may be mounted at the upper end of the section 14a by suitable bolt means 144, it being understood that the section 14a could be extended instead.

By appropriate adjustment of the areas of the lower two diaphragms of the regulator of the invention, accordingly, a feedback means is provided which may be either positive or negative, with substantially any gain desired. Thus the regulator may be made to supply a controlled pressure which increases at any desired rate with an increase in inlet pressure, stays fixed or substantially constant during any change in inlet pressure, or decreases at any desired rate with an increase in inlet pressure.

The control function thus afforded may be utilized in a variety of applications where it is necessary to couple mechanical, electrical, hydraulic and pneumatic systems together, since the regulator can be made responsive to any one or more of such forces as a control input. For example, it could apply an electric signal via a torque motor to large magnetic or hydraulic systems.

Although I have described my invention with respect to certain specific principles and details thereof, it will be understood by those skilled in the art that these could be varied without departing from the spirit and scope of the invention as set forth in the hereunto appended claims.

I claim as my invention:

1. A pressure regulator comprising a casing having a valve orifice, a valve, a diaphragm, resetting means for said diaphragm, a double diaphragm structure, means connecting said double diaphragm structure, said diaphragm and said valve for mutual movement in each direction axially in response to resetting by said resetting means and fluid pressures on said diaphragm and said double diaphragm structure, said casing having an inlet orifice on one side of said valve orifice adapted to introduce fluid to be pressure controlled into contact with the diaphragm of said double diaphragm structure adjacent said resetting diaphragm, said casing defining an orifice adapted to introduce fluid at the same pressure as the fluid entering the inlet orifice into contact with the other diaphragm of said double diaphragm structure, an orifice adapted to introduce pressure regulating fluid into contact with said double diaphragm structure and an orifice adapted to introduce pressure regulating fluid into contact with said diaphragm associated with said resetting means, and outlet means on the other side of said valve orifice.

2. A test regulator comprising a casing, an inlet, an outlet, a flow orifice between said inlet and said outlet, a valve seat formed cooperatively with said flow orifice, a valve on one side of said flow orifice, double diaphragm means carrying said valve in operative relationship with said valve seat, a diaphragm on the other side of said flow orifice, resetting means engaging said diaphragm on the side thereof further from said flow orifice, means connecting said diaphragm and said valve for mutual movement of said diaphragm and said valve in each direction axially in response to said resetting means, and means for introducing fluid into contact with said double diaphragm means at a side thereof further from said valve orifice, said double diaphragm means exerting force on said valve in the direction of said valve seat in response to fluid pressure at the side of said double diaphragm means further from said valve orifice and said valve transmitting force to said diaphragm by said means connecting said valve and said diaphragm, said valve cooperating with said connecting means to control flow through said flow orifice in accordance with the amount of said force.

3. A test regulator for stabilizing the mercury cycle of a turbine comprising a casing having a valve orifice, a valve, a diaphragm, resetting means for said diaphragm including a speed sensitive shaft extending into said casing, means connecting said shaft with said diaphragm, a double diaphragm structure, means connecting said double diaphragm structure, said diaphragm and said valve for mutual movement in each direction axially in response to resetting by said resetting means and fluid pressures on said diaphragm and said double diaphragm structure, said casing having an inlet orifice on one side of said valve orifice adapted to introduce fluid to be pressure controlled into contact with the diaphragm of said double diaphragm structure adjacent said resetting diaphragm, said casing defining an orifice adapted to introduce fluid at the same pressure as the fluid entering the inlet orifice into contact with the other diaphragm of said double diaphragm structure, an orifice adapted to introduce pressure regulating fluid into contact with said double diaphragm structure and an orifice adapted to introduce pressure regulating fluid into contact with said diaphragm associated with said resetting means, and outlet means on the other side of said valve orifice.

References Cited in the file of this patent
UNITED STATES PATENTS

| | | |
|---|---|---|
| 1,042,745 | Zahn | Oct. 29, 1912 |
| 1,993,585 | Baumann | Mar. 5, 1935 |
| 2,026,704 | Petroe | Jan. 7, 1936 |
| 2,162,779 | Leutwiler | June 20, 1939 |
| 2,226,761 | Fox | Dec. 31, 1940 |
| 2,581,429 | Meyer | Jan. 8, 1952 |
| 2,772,686 | Versoy | Dec. 4, 1956 |
| 2,823,686 | Anderson | Feb. 18, 1958 |
| 2,842,146 | Schuster | July 8, 1958 |